UNITED STATES PATENT OFFICE.

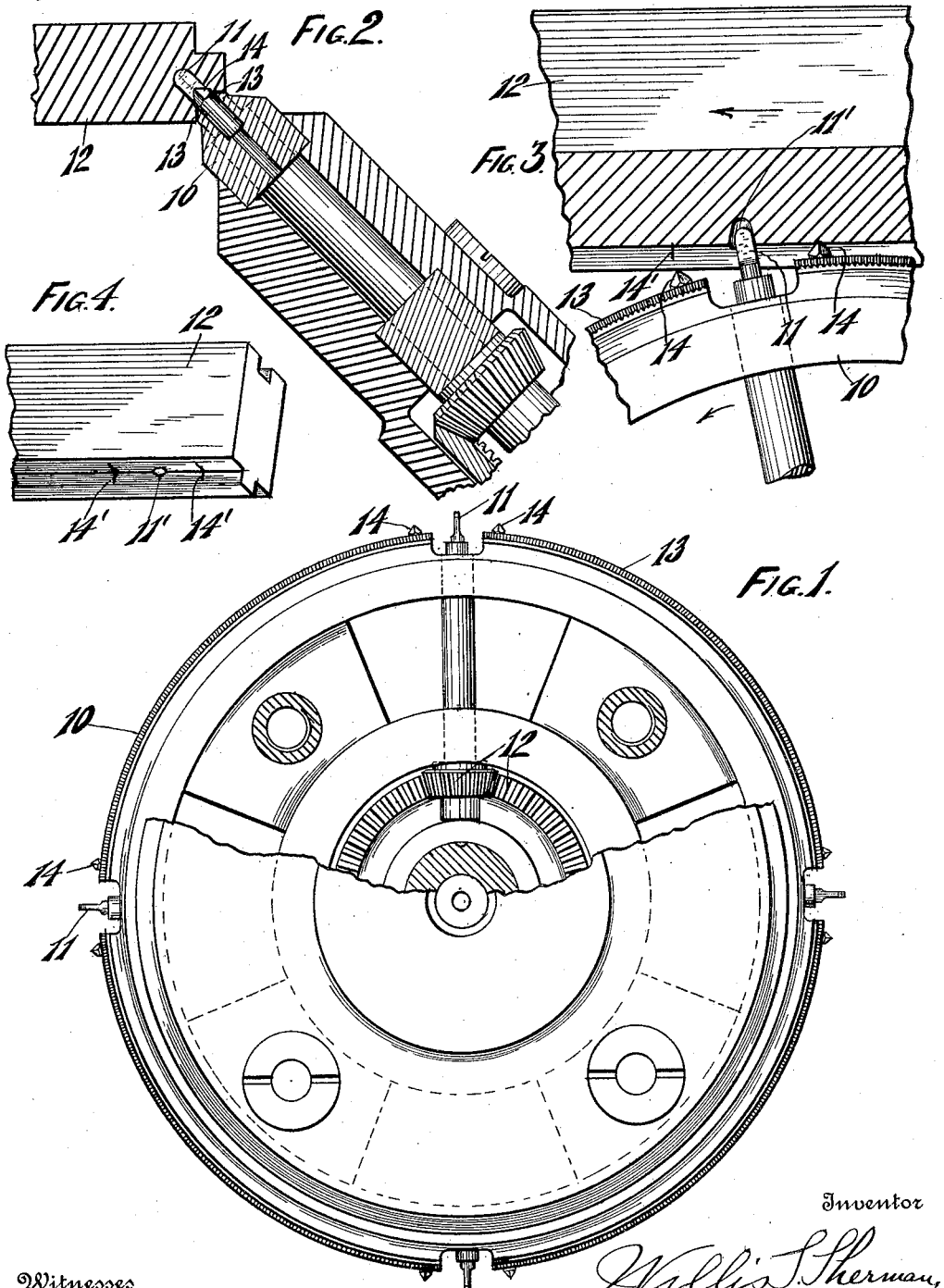

WILLIS S. SHERMAN, OF MILWAUKEE, WISCONSIN.

BORING-MACHINE.

1,102,695.

Specification of Letters Patent. Patented July 7, 1914.

Application filed November 3, 1911. Serial No. 658,297.

*To all whom it may concern:*

Be it known that I, WILLIS S. SHERMAN, a citizen of the United States, and resident of Milwaukee, in the county of Milwaukee and State of Wisconsin, have invented new and useful Improvements in Boring-Machines, of which the following is a description, reference being had to the accompanying drawings, which are a part of this specification.

This invention has for its object to provide the rotary head of a boring machine for boring nail openings in the edge of flooring and the like with work engaging means which will bite into the edge of the work at the time the drills are engaged with the work and form a positive driving connection between the work and the drill head to relieve the drills of the lateral pressure of the work against them incident to the turning of the drill head by the feed of the work.

With the above and other objects in view the invention consists in the boring machine as herein claimed and all equivalents.

Referring to the accompanying drawings in which like characters of reference indicate the same parts in the different views: Figure 1 is a face view of a drill head for a boring machine constructed in accordance with this invention; Fig. 2 is a sectional view of a portion thereof showing the engagement of the drill and the spurs with the edge of the work; Fig. 3 is a detail view with the work sectioned on the plane of the axis of the drill, showing a drill leaving the work; and, Fig. 4 is a view of the edge of the work showing the drill opening and the marks left by the spurs.

In these drawings 10 indicates the circular drill head of a boring machine of the type in which radial drills 11 suitably driven by intermeshing gears 12 are caused to successively engage the edge of flooring or the like as it is fed past the drill head, the drill head being turned by its frictional contact with the moving work. The edge of the drill head is beveled on opposite sides to permit it to fit in the rabbet beneath the tongue of a strip of flooring 12 or the like and these beveled edges are knurled, as shown at 13, to produce a sufficient frictional contact between the drill head and the work to cause the drill head to be turned by the movement of the work.

It has been found in practice that the resistance offered to the entry of the drills in the work has a tendency to force the drill head from the work and disengage the knurled edges from the work so that the drill head receives its turning motion from the engagement of the drills with the work, thus giving the drills a tendency to cut elongated openings and frequently resulting in the drills being broken from the lateral pressure of the work against them.

By the present invention the drills are relieved of the lateral pressure of the work by means of spurs 14 which project from the drill head at the front and the rear of each drill, said spurs being sharpened to cut well into the work and prevent the work slipping on the drill head. The spurs are preferably sharpened with four flat faces so that two biting edges opposite each other will stand approximately at right angles to each other to cut into the edge of the flooring and the side of the tongue thereof respectively as shown in Fig. 2, leaving the impression of their engagement in the form of straight lines 14′ across this angular surface in front of and to the rear of the openings 11′ cut by the drills as shown in Fig. 4.

In operation the work in being fed through the machine turns the drill head by its engagement with the knurled edges 13 thereof as usual, but when the drill enters the work it does not assume the burden of communicating the feeding pressure of the work to the drill head, for the spur directly in front of the drill bites into the work with its angular knife edge and constitutes a positive driving connection between the work and the drill head which remains effective during the inward movement of the drill and until the spur following the drill similarly engages the work and takes up the duty of maintaining the positive driving connection between the work and the drill head. The drills being relieved of the lateral pressure of the work against them do not have the tendency to cut elongated openings and do not permit of a slippage between the work and the drill head to disturb the regular measured intervals between the openings, and furthermore the drills are relieved of their tendency to break which was due to the presence of such lateral pressure when the spurs were not provided. The spurs may be made integral with the outer edge of the drill head or they may be removably set in openings therein.

What I claim as new and desire to secure by Letters Patent is:

1. A rotatable drill head for boring machines provided with a suitably driven radial drill, with a projecting unyielding spur on the drill head adapted to engage the work at the time the drill engages the work and to be forced into the work by the turning movement of the drill head to relieve the drill from lateral pressure incident to the feed of the work.

2. A rotatable drill head for boring machines adapted to be rotated by the engagement of the moving work therewith, a suitably driven radial drill carried by the drill head, and a pair of unyielding spurs on the edge of the drill head, one positioned directly in front of the drill and the other positioned directly behind the drill for engaging the work and adapted to be forced into the work by the turning movement of the drill head and relieving the drill from the feeding pressure thereof.

3. A rotatable drill head for boring machines having an angular knurled edge to engage the rabbeted edge of a strip of flooring or the like work and adapted to be rotated through such engagement by the feeding movement thereof, a radial drill carried by the drill head for entering the work, and unyielding spurs projecting from the edge of the drill head in front of and at the rear of the drill and provided with pointed ends forming opposite knife edges forced into the work by the turning movement of the drill head to cut into the surfaces of the work forming the rabbet and constitute a positive driving connection between the work and the drill head to relieve the drill from lateral pressure.

In testimony whereof, I affix my signature, in presence of two witnesses.

WILLIS S. SHERMAN.

Witnesses:
R. S. C. CALDWELL,
KATHERINE HOLT.

---

Copies of this patent may be obtained for five cents each, by addressing the "Commissioner of Patents, Washington, D. C."